United States Patent
Mori

(10) Patent No.: US 12,308,451 B2
(45) Date of Patent: May 20, 2025

(54) BATTERY PACK

(71) Applicant: Murata Manufacturing Co., Ltd., Nagaokakyo (JP)

(72) Inventor: Michiya Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 694 days.

(21) Appl. No.: 17/666,622

(22) Filed: Feb. 8, 2022

(65) Prior Publication Data

US 2022/0158285 A1    May 19, 2022

Related U.S. Application Data

(63) Continuation of application No. PCT/JP2020/029878, filed on Aug. 4, 2020.

(30) Foreign Application Priority Data

Aug. 9, 2019   (JP) .................... 2019-148029

(51) Int. Cl.
*H01M 50/213* (2021.01)
*H01M 50/503* (2021.01)
*H01M 50/522* (2021.01)

(52) U.S. Cl.
CPC ....... *H01M 50/213* (2021.01); *H01M 50/503* (2021.01); *H01M 50/522* (2021.01)

(58) Field of Classification Search
CPC ............. H01M 50/213; H01M 50/222; H01M 50/224; H01M 50/503; H01M 50/522
See application file for complete search history.

(56) References Cited

U.S. PATENT DOCUMENTS

| | | | |
|---|---|---|---|
| 2008/0131765 A1* | 6/2008 | Imanaga | H01M 50/51 219/127 |
| 2014/0234668 A1 | 8/2014 | Sweney et al. | |
| 2016/0149177 A1 | 5/2016 | Sugeno et al. | |
| 2018/0040862 A1 | 2/2018 | Yi | |

FOREIGN PATENT DOCUMENTS

| | | |
|---|---|---|
| JP | 2003-217555 A | 7/2003 |
| JP | 2005-317458 A | 11/2005 |
| JP | 2010-282811 A | 12/2010 |
| JP | 2015-011956 A | 1/2015 |
| JP | 2016-514345 A | 5/2016 |
| JP | 2018-005984 A | 1/2018 |

OTHER PUBLICATIONS

Machine translation of Haga et al (JP 2018-005984, published Jan. 11, 2018, cited in IDS filed Feb. 25, 2022). (Year: 2018).*
Official Communication issued in International Patent Application No. PCT/JP2020/029878, mailed on Oct. 27, 2020.

* cited by examiner

*Primary Examiner* — Kevin E Yoon
*Assistant Examiner* — Jacky Yuen
(74) *Attorney, Agent, or Firm* — Keating & Bennett, LLP

(57) ABSTRACT

A battery pack includes multiple batteries with tubular shape and in parallel or substantially in parallel to each other, and a tab to electrically connect the multiple batteries to each other. The multiple batteries include a first set of batteries in parallel or substantially in parallel in an X-axis direction, and a second set of batteries in parallel or substantially in parallel in the X-axis direction, and adjacent to the first set in a Y-axis direction. Each of the batteries in the first set is connected by the tab to a battery other than a battery at a shortest distance among the batteries in the second set.

18 Claims, 11 Drawing Sheets

BATTERY PACK

CROSS REFERENCE TO RELATED APPLICATIONS

This application claims the benefit of priority to Japanese Patent Application No. 2019-148029 filed on Aug. 9, 2019 and is a Continuation Application of PCT Application No. PCT/JP2020/029878 filed on Aug. 4, 2020. The entire contents of each application are hereby incorporated herein by reference.

BACKGROUND OF THE INVENTION

1. Field of the Invention

The present invention relates to a battery pack.

2. Description of the Related Art

There has been proposed a battery pack including a battery block aggregate in which multiple cylindrical secondary batteries are arranged vertically and horizontally, so as to be perpendicular to a specific surface of a case, such that the secondary batteries adjacent to each other are arranged in a staggered formation, and a storage case that stores the battery block aggregate (see, for example, Japanese Unexamined Patent Application Publication No. 2005-317458). The battery pack further includes a lead plate which is connected in common to electric power of the multiple secondary batteries configuring the battery block aggregate, and connects the multiple secondary batteries in parallel. In this battery pack, the cylindrical secondary batteries adjacent to each other are arranged in a staggered formation in a limited space in the storage case. Accordingly, even when external force is applied to the battery pack due to dropping of the battery pack onto the ground, collision between the battery packs arranged adjacent to each other, or the like, crushing of the secondary battery is suppressed, and a safe state is maintained.

However, in the battery pack described in Japanese Unexamined Patent Application Publication No. 2005-317458, since the multiple secondary batteries are arranged in a staggered formation in a limited space in the storage case, the adjacent secondary batteries are close to each other. Thus, when one secondary battery ignites, since the batteries are arranged in a limited space, heat transmitted through the lead plate, and heat transmitted through air existing in a gap generated between the secondary batteries are concentrated on the secondary battery close to the ignited battery. Accordingly, the secondary battery close to the secondary battery that has ignited first is heated to a high temperature, and as a result, secondary ignition may occur.

SUMMARY OF THE INVENTION

Preferred embodiments of the present invention provide battery packs in each of which, when one of multiple batteries in a preset space ignites, fire spreading to the other batteries is reduced or prevented.

A battery pack according to a preferred embodiment of the present invention includes a plurality of batteries with a tubular shape and parallel or substantially parallel to each other, and a tab to electrically connect the plurality of batteries to each other, wherein the plurality of batteries include a first set of batteries parallel or substantially parallel in a first direction, and a second set of batteries parallel or substantially parallel in the first direction, and adjacent to the first set in a second direction orthogonal or substantially orthogonal to the first direction, and each of the batteries in the first set is connected by the tab to a battery other than a battery at a shortest distance among the batteries in the second set.

Further, in a battery pack according to a preferred embodiment of the present invention, the plurality of batteries may be positioned to define a zigzag pattern.

Further, in a battery pack according to a preferred embodiment of the present invention, the tab includes a first tab connecting respective electrode terminals of a portion of the plurality of batteries to each other, a second tab connecting respective electrode terminals of remaining batteries other than the portion of the plurality of batteries to each other, and the first tab and the second tab may intersect each other at least at one position when viewed in a plan view from an axial direction of each of the plurality of batteries.

Further, in a battery pack according to a preferred embodiment of the present invention, the first tab and the second tab may be spaced at a distance in the axial direction of each of the plurality of batteries.

Further, in a battery pack according to a preferred embodiment of the present invention, the first tab and the second tab may be electrically connected to each other at least partially, at a portion where the first tab and the second tab intersect each other when viewed in a plan view from the axial direction of each of the plurality of batteries.

Further, in a battery pack according to a preferred embodiment of the present invention, the tab may include a plurality of sub-tabs.

Further, in a battery pack according to a preferred embodiment of the present invention, each of the plurality of batteries includes a positive electrode terminal on one end portion in an axial direction of each of the plurality of batteries, and a negative electrode terminal on another end portion in the axial direction, batteries arranged in parallel or substantially in parallel in the first direction may be arranged such that directions extending from positive electrode terminals, each of which being the positive electrode terminal of each of the batteries, toward negative electrode terminals, each of which being the negative electrode terminal of each of the batteries, in the axial direction are the same, and are opposite to a direction extending from the positive electrode terminal toward the negative electrode terminal in the axial direction in each of the batteries adjacent in the second direction and arranged in parallel or substantially in parallel in the first direction.

According to preferred embodiments of the present invention, a plurality of batteries include a first set of batteries in parallel or substantially in parallel in a first direction, and a second set of batteries in parallel or substantially in parallel in a first direction, and adjacent to the first set in a second direction orthogonal or substantially orthogonal to the first direction. Then, each of the batteries in the first set is connected by a tab to a battery other than a battery at a shortest distance among the batteries in the second set. Thus, when one battery of the multiple batteries ignites, heat is reduced or prevented from being intensively transmitted to the battery at the shortest distance from the ignited battery. Thus, fire spreading to other batteries caused by other batteries at the shortest distance from the ignited battery being heated to high temperatures is reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the drawings. A battery pack according to a preferred embodiment of the present invention includes multiple batteries that are tubular and in parallel or substantially in parallel to each other, and a tab to electrically connect the multiple batteries to each other. Additionally, the multiple batteries include a first set of batteries in parallel or substantially in parallel in a first direction, and a second set of batteries arranged in parallel or substantially in parallel in the first direction, and adjacent to the first set in a second direction orthogonal or substantially orthogonal to the first direction. Each of the batteries in the first set is connected by the tab to a battery other than a battery having a shortest distance among the batteries in the second set.

Figure 1A:
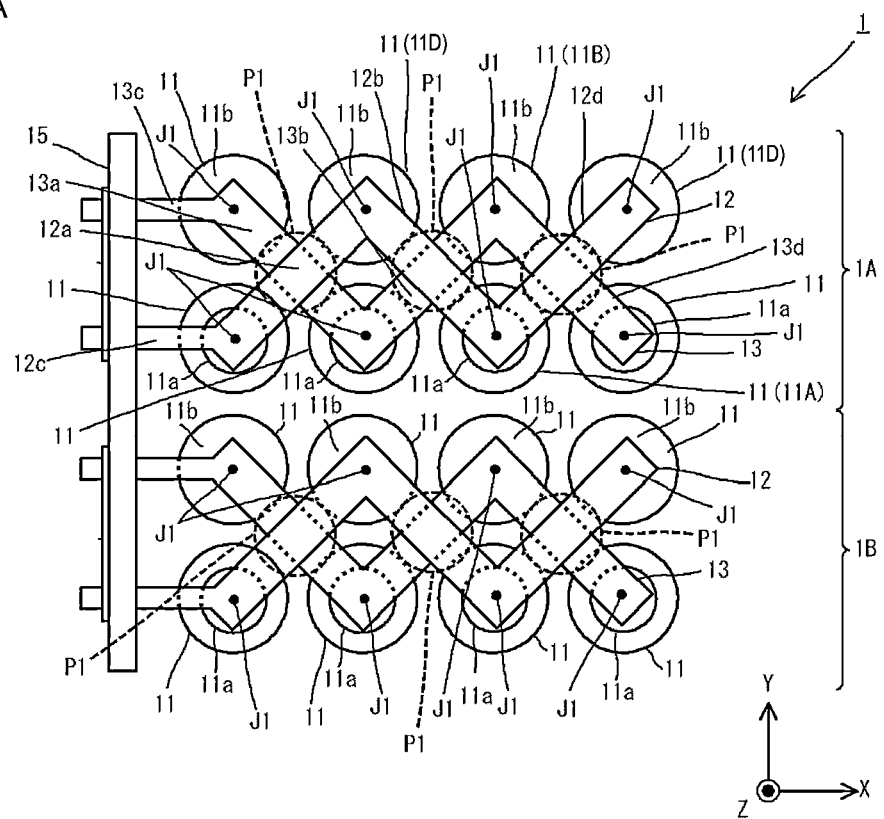
FIG. 1A is a plan view of a battery pack according to a preferred embodiment of the present invention.
Figure 1B:
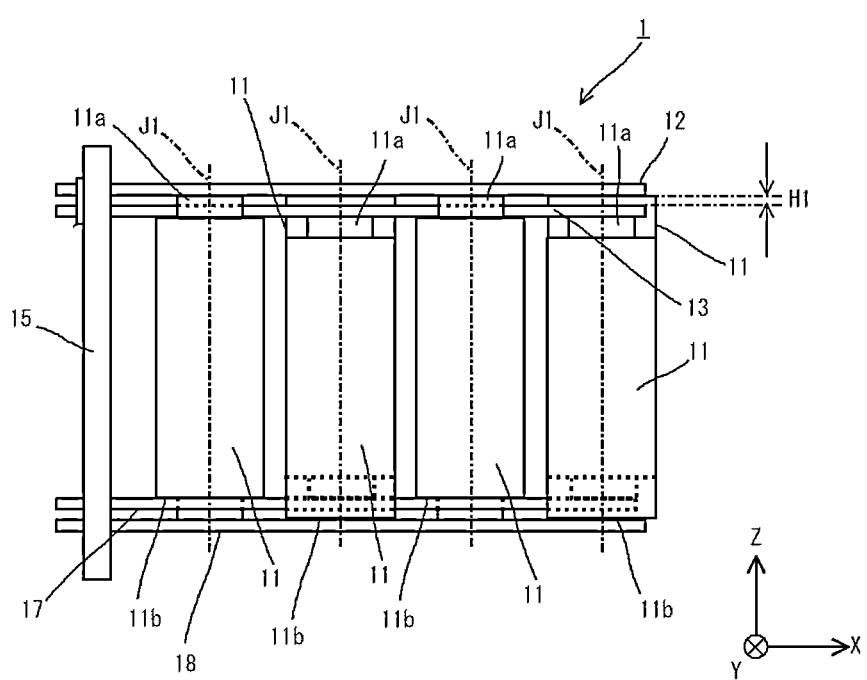
FIG. 1B is a side view of a battery pack according to a preferred embodiment of the present invention.

As illustrated in FIGS. 1A and 1B, a battery pack 1 according to the present preferred embodiment includes two battery modules 1A and 1B, and a printed circuit board (hereinafter, referred to as "PCB") 15. The battery module 1A includes eight batteries 11, and tabs 12, 13, 17, and 18, for example. The battery module 1B also has the same or similar configuration to that of the battery module 1A.

Figure 2:
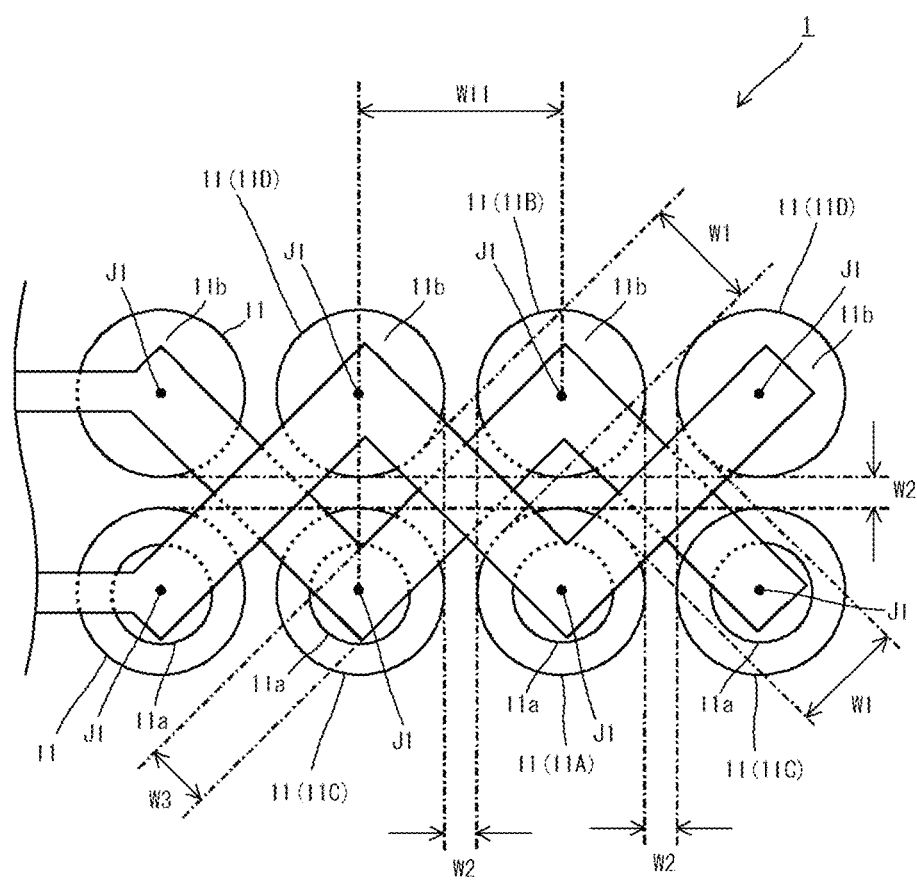
FIG. 2 is a plan view illustrating a portion of a battery pack according to a preferred embodiment of the present invention.
Figure 2:
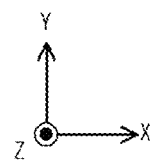

The battery 11 is, for example, a rechargeable secondary battery. As the secondary battery, for example, a lithium-ion battery, a nickel-hydrogen battery, a nickel-cadmium battery, or the like can be used. Each of the eight batteries 11 of battery module 1A or 1B is a cylindrical battery having a cylindrical or substantially cylindrical housing, and includes a positive electrode terminal 11a provided on one end portion in an axial J1 direction, and a negative electrode terminal 11b provided on another end portion in the axial J1 direction. Further, the eight batteries 11 of the battery module 1A or 1B are positioned to define a lattice shape such that the axial J1 directions are parallel or substantially parallel to each other. Then, in the battery module 1A or 1B, sets including the four batteries 11 in parallel or substantially in parallel in an X-axis direction, which is the first direction, that is, a row direction, are arranged in parallel or substantially in parallel in two columns in a Y-axis direction, which is the second direction, that is, a column direction. That is, the eight batteries 11 include the first set of the four batteries arranged in parallel or substantially in parallel in the X-axis direction, and the second set includes the four batteries 11 arranged in parallel or substantially in parallel in the X-axis direction, and adjacent to the first set in the Y-axis direction. Further, as illustrated in FIG. 2, the eight batteries 11 are positioned at equal or substantially equal intervals so that a shortest distance between the batteries 11 adjacent to each other is a distance W2.

In addition, in the battery module 1A or 1B, the four batteries 11 arranged in parallel or substantially in parallel in the row direction on a −Y direction side are positioned such that directions extending from the positive electrode terminals 11a toward the respective negative electrode terminals 11b in the axial J1 direction are the same or substantially the same. To be specific, all directions extending from the positive electrode terminals 11a toward the respective negative electrode terminals 11b of the four batteries 11 arranged in parallel or substantially in parallel in the row direction on the −Y direction side of each of the battery modules 1A and 1B coincide with each other in a +Z direction. Further, in the battery module 1A or 1B, the four batteries 11 arranged in parallel or substantially in parallel in the row direction on the −Y direction side are arranged opposite to a direction extending from the positive electrode terminal 11a toward the negative electrode terminal 11b in the axial J1 direction in each of the four batteries 11 adjacent on a +Y direction side and arranged in parallel or substantially in parallel in the row direction. To be specific, all directions extending from the positive electrode terminals 11a towards the respective negative electrode terminals 11b of the four batteries 11 arranged in parallel or substantially in parallel in the row direction on the +Y direction side of each of the battery modules 1A and 1B coincide with each other in a −Z direction.

Figure 3:
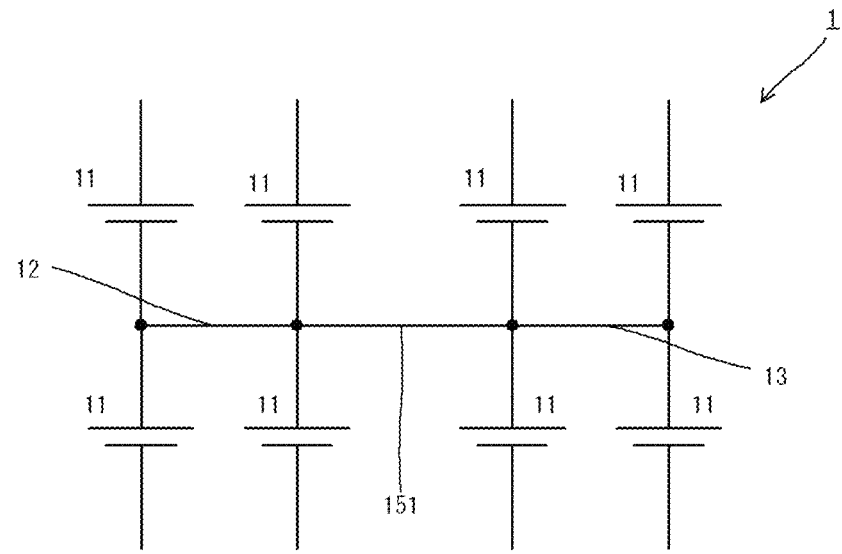
FIG. 3 is a circuit diagram of a battery pack according to a preferred embodiment of the present invention.

Each of the tabs 12 and 13 is a metal plate made of, for example, Cu, Al, or the like. One end portions of the respective tabs 12 and 13 are fixed to the PCB 15, and electrically connected to each other through a conductive pattern (not illustrated) provided on the PCB 15. The tabs 12 and 13 may be electrically connected to each other through, for example, a resistor (not illustrated) mounted on the PCB 15. Further, the tabs 12 and 13 intersect each other at three locations, when viewed in plan from the axial J1 direction of each of the eight batteries 11. Then, as illustrated in FIG. 3, the eight batteries 11 of the battery module 1A or 1B are connected in a configuration of four parallel sets of two batteries in series by the tabs 12 and 13 connecting the positive electrode terminals 11a to the negative electrode terminals 11b provided in the batteries 11. As illustrated in FIG. 1A, the tab 12 is a first tab including connection pieces 12a, 12b, and 12d and an extension piece 12c. Here, the connection piece 12a or 12d connects the positive electrode terminal 11a of the battery 11 on the −Y direction side of the battery module 1A or 1B to the negative electrode terminal 11b of the battery 11 on a +X direction side and the +Y direction side with respect to that battery 11. The connection piece 12b connects the positive electrode terminal 11a of the battery 11 on the −Y direction side to the negative electrode terminal 11b of the battery 11 on a −X direction side and the +Y direction side with respect to that battery 11. The extension piece 12c extends in the −X direction from an end portion of the connection piece 12a located closest to the −X direction side, on an opposite side to a side continuous with the connection piece 12b.

The tab 13 is a second tab including connection pieces 13a, 13b, and 13d and an extension piece 13c. The connection piece 13a or 13d connects the negative electrode terminal 11b of the battery 11 on the +Y direction side of the battery module 1A or 1B to the positive electrode terminal 11a of the battery 11 on the +X direction side and the −Y direction side with respect to that battery 11. The connection piece 13b connects the negative electrode terminal 11b of the battery 11 on the +Y direction side to the positive electrode terminal 11a of the battery 11 on the −X direction side and the −Y direction side with respect to that battery 11. The extension piece 13c extends in the −X direction from an end portion of the connection piece 13a located closest to the −X direction side, on an opposite side to a side continuous with the connection piece 13b. Further, as illustrated in FIG. 1B, the tab 13 is on the −Z direction side of the tab 12 at a distance from the tab 12. Here, a distance H1 between the tab 12 and the tab 13 is set such that thermal resistance between the tab 12 and the tab 13 at an intersecting portion P1 where the tab 12 and the tab 13 intersect each other is sufficiently smaller than thermal resistance of the tab 12 and the tab 13. Note that, the tab 17 has a configuration the same as or similar to that of the tab 13, and the tab 18 has a configuration the same as or similar to that of the tab 12.

Incidentally, as illustrated in FIG. 2, the tab 12 is provided so as to connect any of the four batteries 11 arranged in parallel or substantially in parallel in the X-axis direction on the −Y direction side to the battery 11 other than the battery 11 at a shortest distance from any of the four batteries 11 located on the −Y direction side among the four batteries 11 adjacent in the +Y direction. The tab 12 connects, for example, the battery 11A and two batteries 11D other than a battery 11B at a distance from the battery 11A of a shortest distance W2 among the four batteries 11 located on the +Y direction side. The tab 13 is provided so as to connect any of the four batteries 11 arranged in parallel or substantially in parallel in the X-axis direction on the +Y direction side to the battery 11 other than the battery 11 at a shortest distance from any of the four batteries 11 located on the +Y direction side among the four batteries 11 adjacent in the −Y direction. The tab 13 connects, for example, the battery 11B and two batteries 11C other than the battery 11A at a distance from the battery 11B of the shortest distance W2 among the four batteries 11 located on the −Y direction side.

Figure 4A:
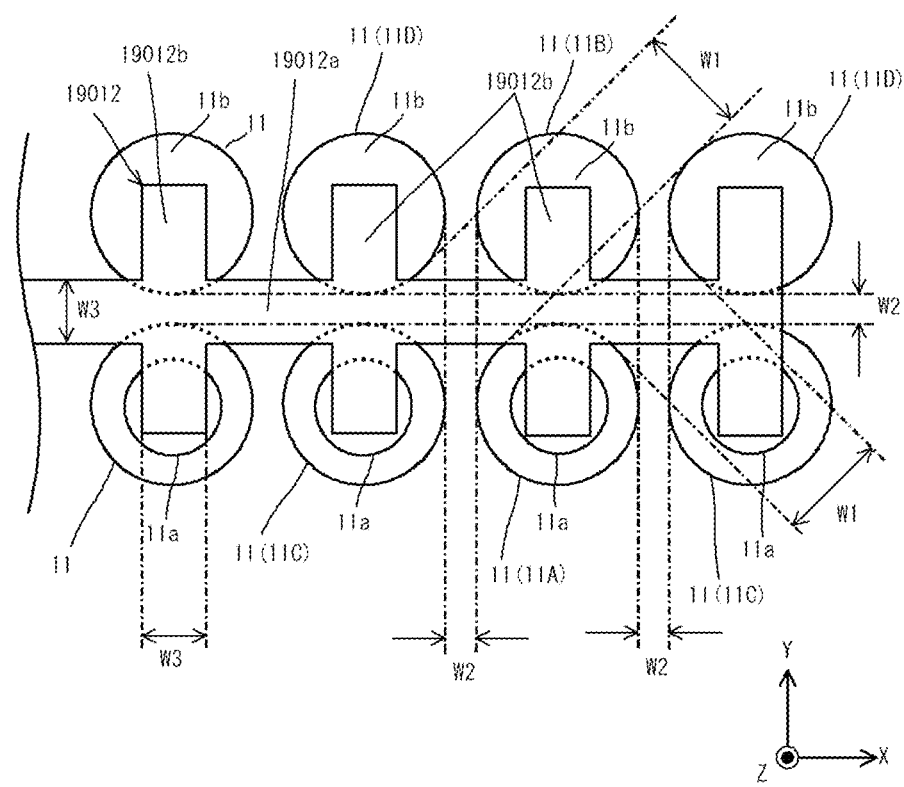
FIG. 4A is a plan view of a battery pack according to a comparative example.
Figure 4B:
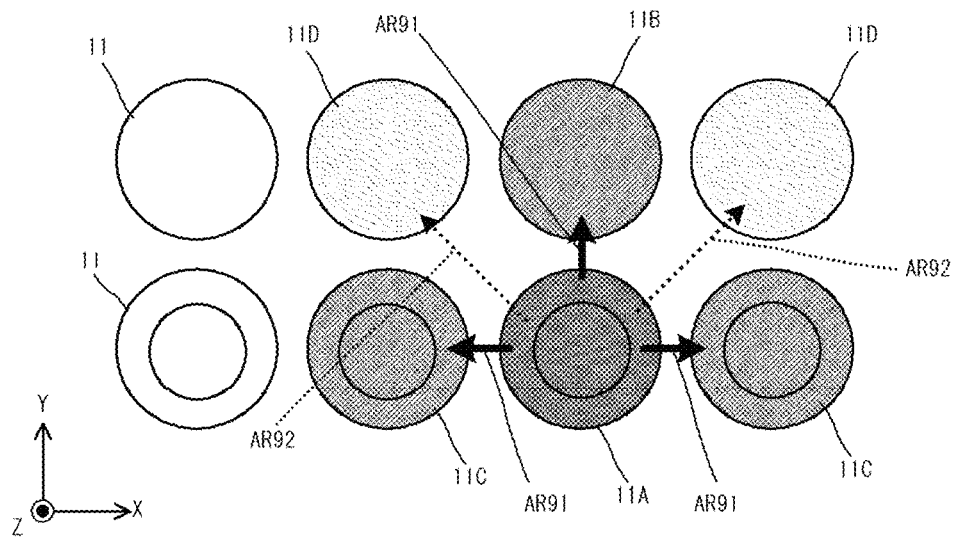
FIG. 4B is a diagram for explaining functions of the battery pack according to the comparative example.

Here, a function of the battery pack 1 according to the present preferred embodiment will be described in comparison with a comparative example. As illustrated in FIG. 4A, a battery pack according to the comparative example includes a tab 19012 including a main piece 19012a with a width W3 extending in the X-axis direction, and a connection piece 19012b with the width W3 extending from a portion of the main piece 19012a corresponding to the axis J1 of the battery 11 toward the axis J1 of the battery 11. In the battery pack according to the comparative example, a heat transmission path via the tab 19012, and a heat transmission path via air present between the battery 11A and the battery 11B or 11C are provided between the battery 11A and the battery 11B or 11C. In addition, a heat transmission path via the tab 19012, and a heat transmission path via air present between the battery 11A and the battery 11D are provided between the battery 11A and the battery 11D. Here, the shortest distance W2 between the battery 11A and the battery 11B or 11C is shorter than the shortest distance W1 between the battery 11A and the battery 11D. Thus, thermal resistance of the heat transmission path via air between the battery 11A and the battery 11B or 11C is smaller than thermal resistance of the heat transmission path via air between the battery 11A and the battery 11D. Therefore, thermal resistance between the battery 11A and the battery 11B or 11C is smaller than thermal resistance between the battery 11A and the battery 11D. Thus, for example, when the battery 11A ignites and a large amount of heat is generated, an amount of heat transmitted from the battery 11A to the battery 11D is small as indicated by an arrow AR92 in FIG. 4B. On the other hand, as indicated by an arrow AR91 in FIG. 4B, an amount of heat transmitted from the battery 11A to the battery 11B or 11C is large. In this case, since heat generated in the battery 11A is intensively transmitted to the battery 11B or 11C, there is a high possibility that the battery 11B or 11C is heated to a temperature equal to or higher than an ignition temperature.

Figure 5:
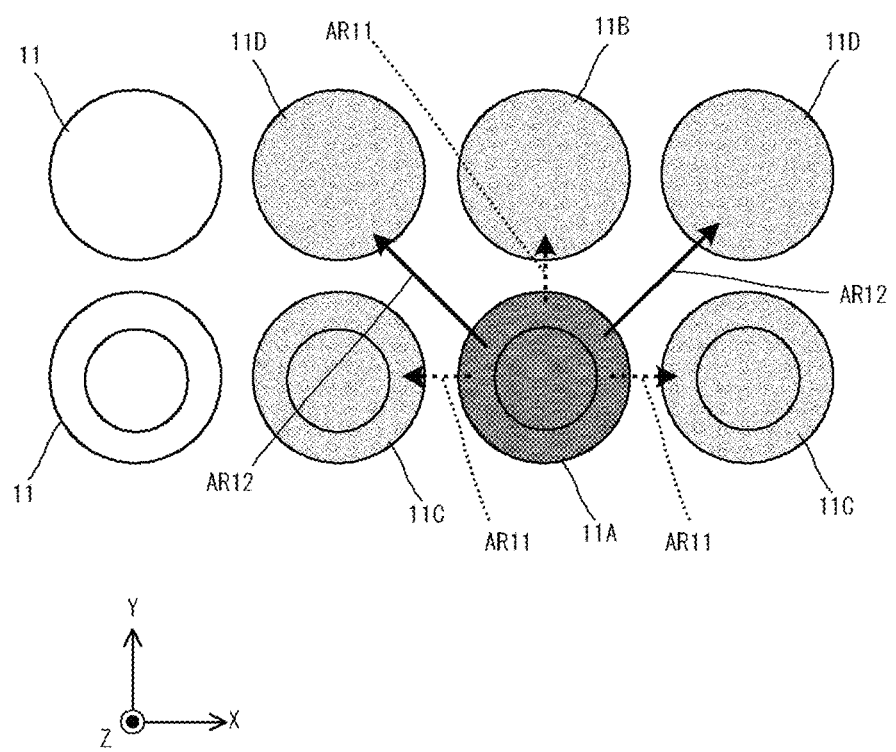
FIG. 5 is a diagram for explaining functions of a battery pack according to a preferred embodiment of the present invention.

On the other hand, in the battery pack 1 according to the present preferred embodiment, only a heat transmission path via air present between the battery 11A and the battery 11B or 11C is provided between the battery 11A and the battery 11B or 11C, and a heat transmission path via the tab 12 and a heat transmission path via air present between the battery 11A and the battery 11D are provided between the battery 11A and the battery 11D. The tab 12 is arranged at a distance from the tab 13 in the axial direction of the battery 11, and thermal resistance of the heat transmission path from the tab 12 to the tab 13 is sufficiently larger than thermal resistance of the heat transmission path via the tab 12. For this reason, thermal resistance between the battery 11A and the battery 11B or 11C is larger than that according to the comparative example, since a heat transmission path via the tabs 12 and 13 is not provided. For this reason, the thermal resistance between the battery 11A and the battery 11B or 11C has a magnitude closer to that of thermal resistance between the battery 11A and the battery 11D than that according to the comparative example. Thus, for example, when the battery 11A ignites and a large amount of heat is generated, as indicated by an arrow AR11 in FIG. 5, an amount of heat transmitted from the battery 11A to the battery 11B or 11C decreases, while as indicated by an arrow AR12 in FIG. 5, an amount of heat transmitted from the battery 11A to the battery 11D increases. As a result, heat generated in the battery 11A is uniformly transmitted to the batteries 11B, 11C, and 11D, such that an excessive temperature rise in each of the batteries 11B, 11C, and 11D is reduced or prevented.

As described above, with the battery pack 1 according to the present preferred embodiment, the tab 12 is provided so as to connect, for example, the battery 11A and the battery 11D other than the battery 11B at a distance from the battery 11A of the shortest distance W2 among the four batteries 11 located on the +Y direction side of the battery 11A. The tab 13 is also provided so as to connect, for example, the battery 11B to the battery 11C other than the battery 11A at a distance from the battery 11B of the shortest distance W2 among the four batteries 11 located on the −Y direction side of the battery 11B. Accordingly, for example, when the battery 11A ignites, heat is reduced or prevented from being intensively transmitted to the battery 11B or 11C at the shortest distance from the ignited battery 11A. Thus, fire spreading to the battery 11B or 11C caused by the battery 11B or 11C at the distance of the shortest distance W2 from the ignited battery 11A being heated to a high temperature is reduced or prevented.

Further, the tabs 12 and 13 according to the present preferred embodiment are arranged at a distance in the axial J1 direction of each of the eight batteries 11. This increases thermal resistance between each of the eight batteries 11 and the other batteries 11 adjacent to each other at the shortest distance W2, for example, as compared to a case where the tabs 12 and 13 are in contact with each other. Thus, when any one of the eight batteries 11 ignites, heat generated in the ignited battery 11 is reduced or prevented from being intensively transmitted to the other batteries 11 adjacent to that battery 11 at the shortest distance W2.

Further, the tabs 12 and 13 according to the present preferred embodiment intersect each other at three positions, when viewed in plan from the axial J1 direction of each of the eight batteries 11. Accordingly, a space for arranging the tabs 12 and 13 in the housing of the battery pack 1 can be reduced, so that the battery pack 1 can be reduced in size. Further, for example, an amount of heat transmitted from the battery 11A to each of the batteries 11B, 11C, and 11D present around the battery 11A can be equalized or substantially equalized. Thus, heat generated in the battery 11A is reduced or prevented from being intensively transferred to the batteries 11B and 11C.

Further, among the eight batteries according to the present preferred embodiment, the four batteries in parallel or substantially in parallel in the row direction are arranged such that the directions extending from the positive electrode terminals 11*a* toward the respective negative electrode terminals 11*b* in the axial J1 direction are the same or substantially the same. Further, the batteries 11 adjacent to each other in the column direction are arranged such that directions extending from the positive electrode terminals 11*a* toward the respective negative electrode terminals 11*b* in the axial J1 directions are opposite to each other. Accordingly, in each of the battery modules 1A and 1B, lengths of the respective tabs 12 and 13 connecting the eight batteries 11 in the configuration of four parallel sets of two batteries in series can be shortened, and the battery pack 1 can be reduced in size accordingly. In addition, since the lengths of the respective tabs 12 and 13 can be shortened, a power loss in the tabs 12 and 13 can be reduced accordingly.

Figure 6A:
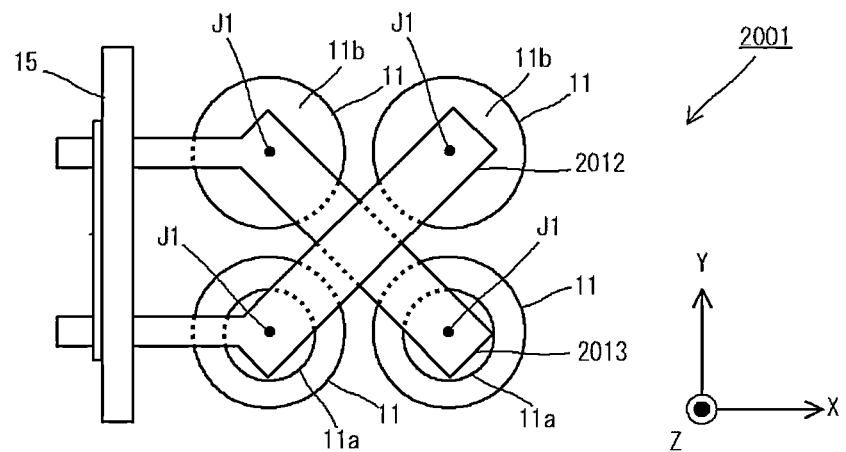
FIG. 6A is a plan view of a battery pack according to a modified example of a preferred embodiment of the present invention.
Figure 6B:
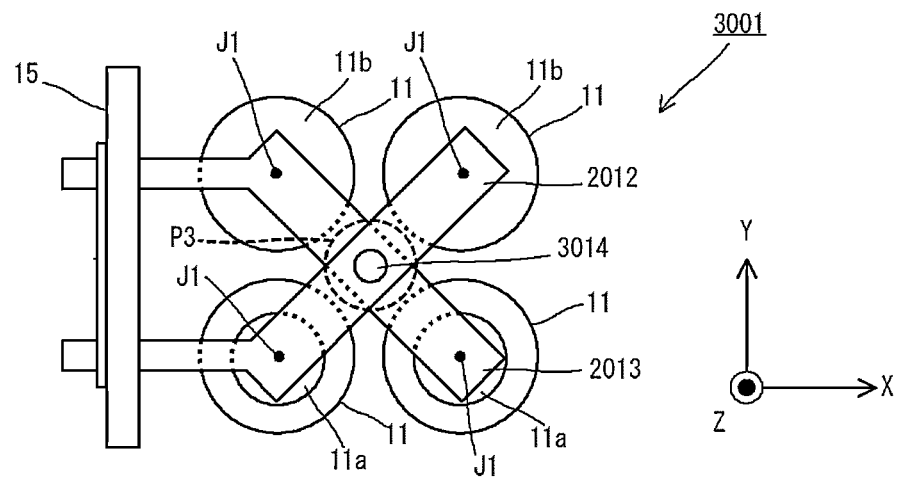
FIG. 6B is a plan view of a battery pack according to a modified example of a preferred embodiment of the present invention.
Figure 6C:
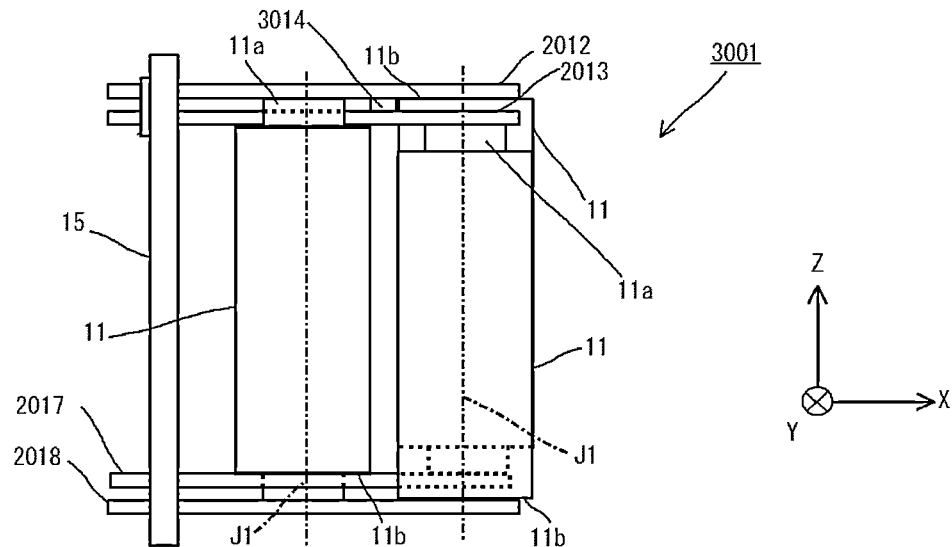
FIG. 6C is a side view of the battery pack according to the modified example of a preferred embodiment of the present invention.

Although the present preferred embodiment of the present invention has been explained above, the present invention is not limited to the configuration of the above-described preferred embodiment. For example, as in a battery pack 2001 illustrated in FIG. 6A, tabs 2012 and 2013 may connect the four batteries 11 in the configuration of two parallel sets of two batteries in series. The tabs 2012 and 2013 intersect each other at one position, when viewed in plan view from the axial J1 direction of each of the four batteries 11. Further, the tabs 2012 and 2013 are arranged at an interval in the axial J1 direction of each of the four batteries 11. Alternatively, as in a battery pack 3001 illustrated in FIGS. 6B and 6C, the tabs 2012 and 2013 may be coupled to each other with a coupling portion 3014 interposed therebetween at an intersecting portion P3 where the tabs 2012 and 2013 intersect each other when viewed in plan from the axial J1 direction of each of the four batteries 11. The coupling portion 3014 refers to a portion where the tab 2012 and the tab 2013 are electrically connected to each other. Then, thermal resistance per unit length of the coupling portion 3014 in the Z-axis direction is larger than thermal resistance per unit length of each of the tabs 2012 and 2013 in an extending direction. Further, the coupling portion 3014 may be formed by, for example, spot welding.

Figure 7A:
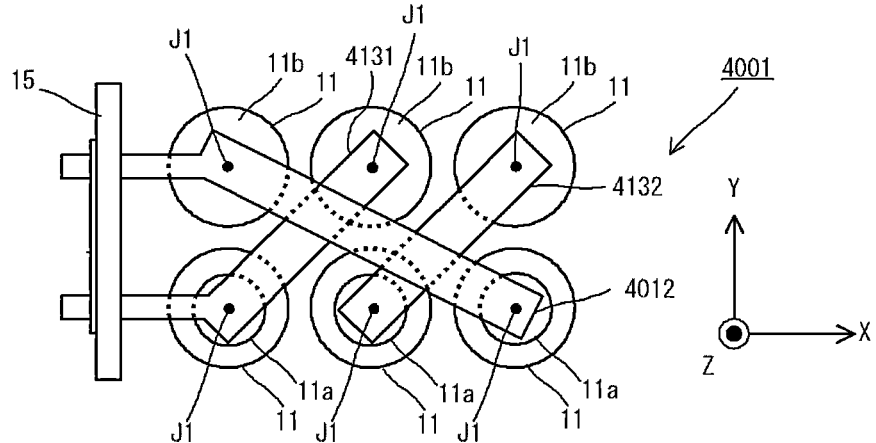
FIG. 7A is a plan view of a battery pack according to a modified example of a preferred embodiment of the present invention.
Figure 7B:
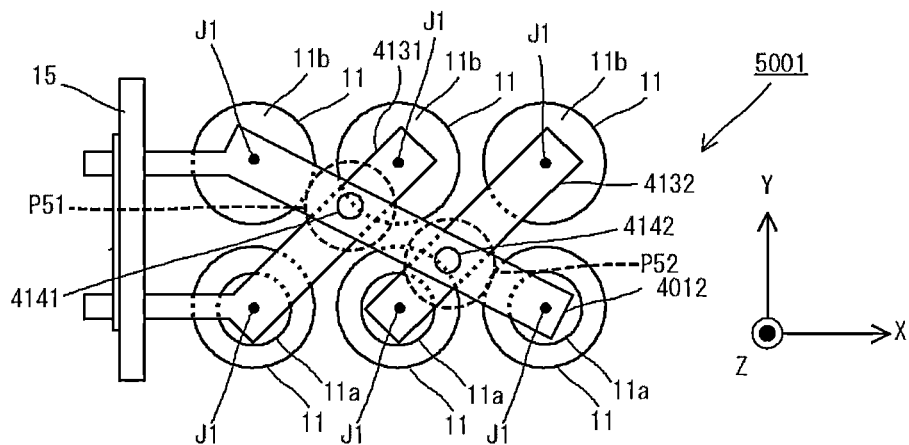
FIG. 7B is a plan view of a battery pack according to a modified example of a preferred embodiment of the present invention.
Figure 7C:
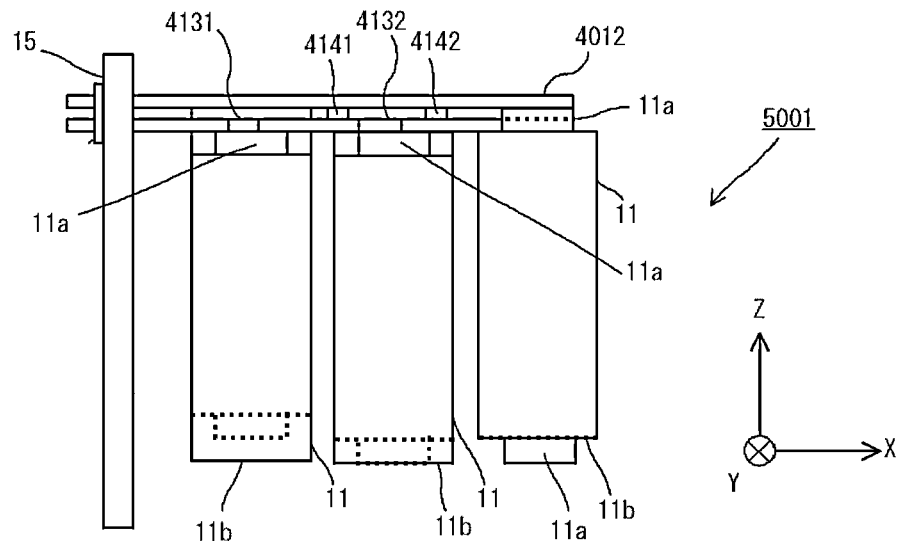
FIG. 7C is a side view of the battery pack according to a modified example of a preferred embodiment of the present invention.

In the present preferred embodiment, the configuration including the two tabs 12 and 13 has been explained, but the present invention is not limited thereto, and for example, as in a battery pack 4001 illustrated in FIG. 7A, the six batteries 11 may be connected in the configuration of three parallel sets of two batteries in series by three tabs 4012, 4131, and 4132. The tab 4012, and the tabs 4131 and 4132 intersect each other at two positions when viewed in plan from the axial J1 direction of each of the six batteries 11. Further, the tab 4012, and the tabs 4131 and 4132 are spaced apart from each other in the axial J1 direction of each of the six batteries 11. Alternatively, as in a battery pack 5001 illustrated in FIGS. 7B and 7C, the tab 4012, and the tabs 4131 and 4132 may be coupled to each other, with coupling portions 4141 and 4142 interposed therebetween at intersecting portions P51 and P52, respectively, where the tab 4012 and the tabs 4131 and 4132 intersect each other, when viewed in plan view from the axial J1 direction of each of the six batteries 11. Here, thermal resistance per unit length of each of the coupling portions 4141 and 4142 in the Z-axis direction is larger than thermal resistance per unit length of each of the tabs 4012, 4131, and 4132 in an extending direction. Further, each of the coupling portions 4141 and 4142 may be formed by, for example, spot welding.

Figure 8A:
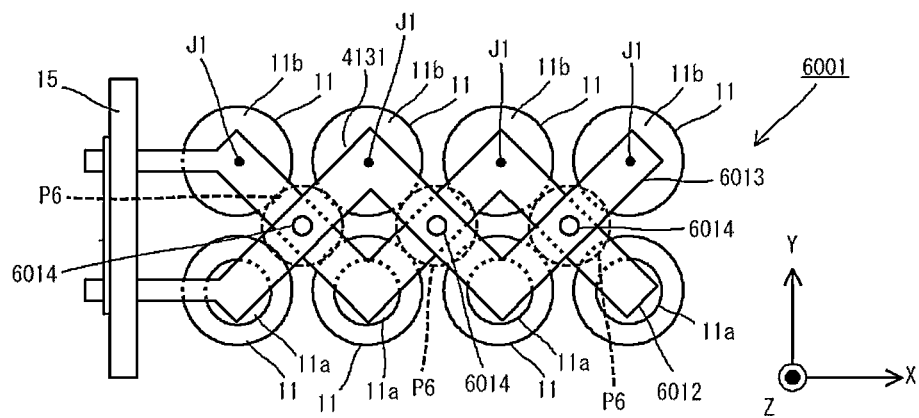
FIG. 8A is a plan view of a battery pack according to a modified example of a preferred embodiment of the present invention.

Although the example in which the two tabs 12 and 13 are spaced apart from each other in the Z-axis direction has been explained in the above-described preferred embodiment, the present invention is not limited thereto, and for example, as in a battery pack 6001 illustrated in FIG. 8A, tabs 6012 and 6013 may be coupled to each other with a coupling portion 6014 interposed therebetween at each intersecting portion P6 where the tabs 6012 and 6013 intersect each other when viewed in plan from the axial J1 direction of each of the eight batteries 11. Here, thermal resistance per unit length of the coupling portion 6014 in the Z-axis direction is larger than thermal resistance per unit length of each of the tabs 6012 and 6013 in an extending direction. Further, each coupling portion 6014 may be formed by, for example, spot welding.

Figure 8B:
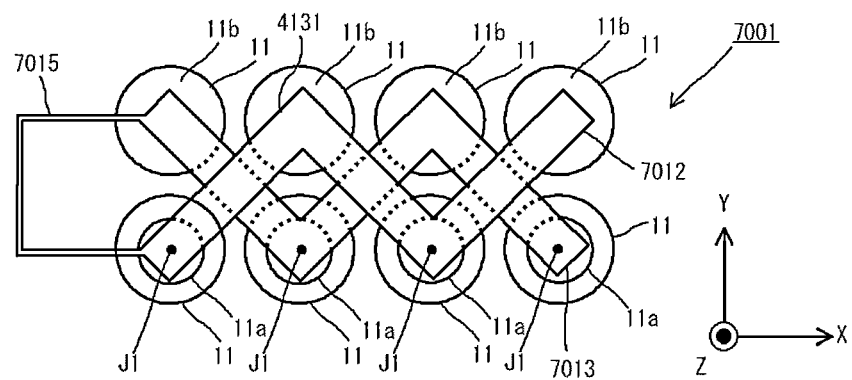
FIG. 8B is a plan view of a battery pack according to a modified example of a preferred embodiment of the present invention.

In the above-described preferred embodiment, the example in which the two tabs 12 and 13 are connected by a conductor pattern provided on the PCB 15 has been described, but the present invention is not limited thereto. For example, as in a battery pack 7001 illustrated in FIG. 8B, two tabs 7012 and 7013 may be connected with a conductive wire 7015 interposed therebetween which is narrower than the tabs 7012 and 7013, and whose thermal resistance per unit length is sufficiently larger than that of the tabs 7012 and 7013.

Figure 9A:
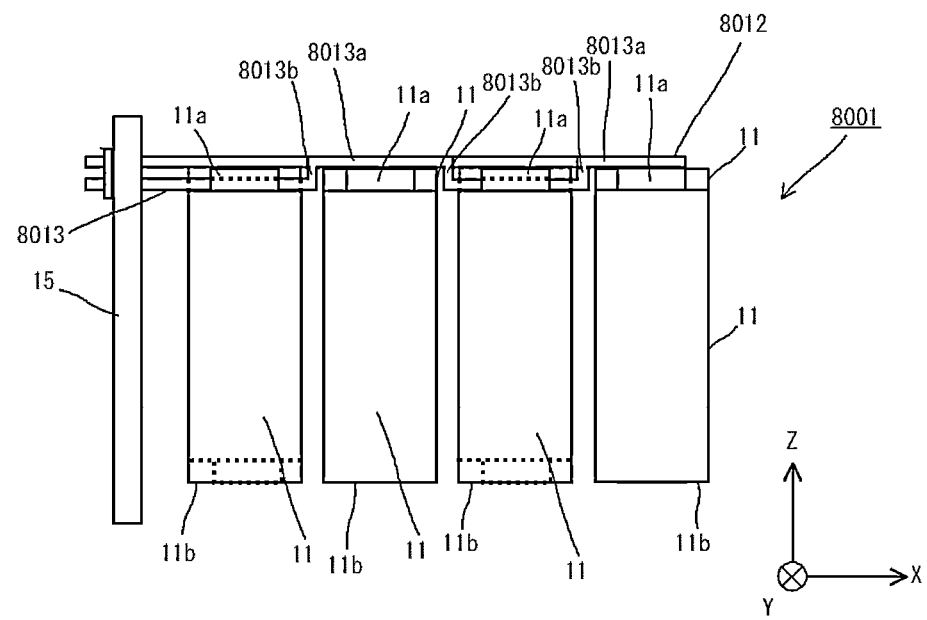
FIG. 9A is a side view of a battery pack according to a modified example of a preferred embodiment of the present invention.
Figure 9B:
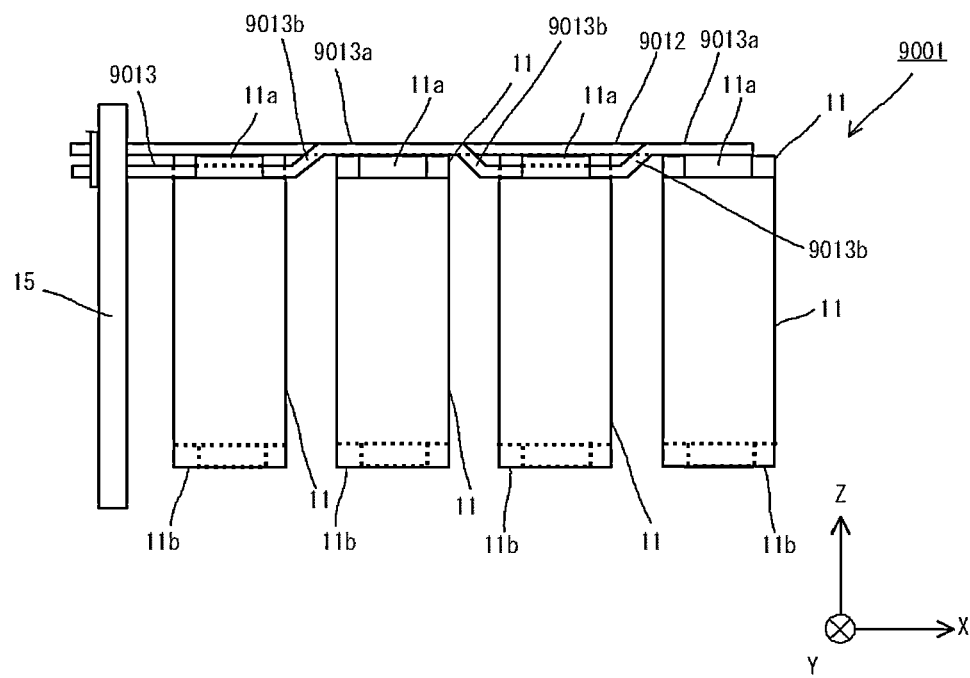
FIG. 9B is a side view of a battery pack according to a modified example of a preferred embodiment of the present invention.
Figure 10:
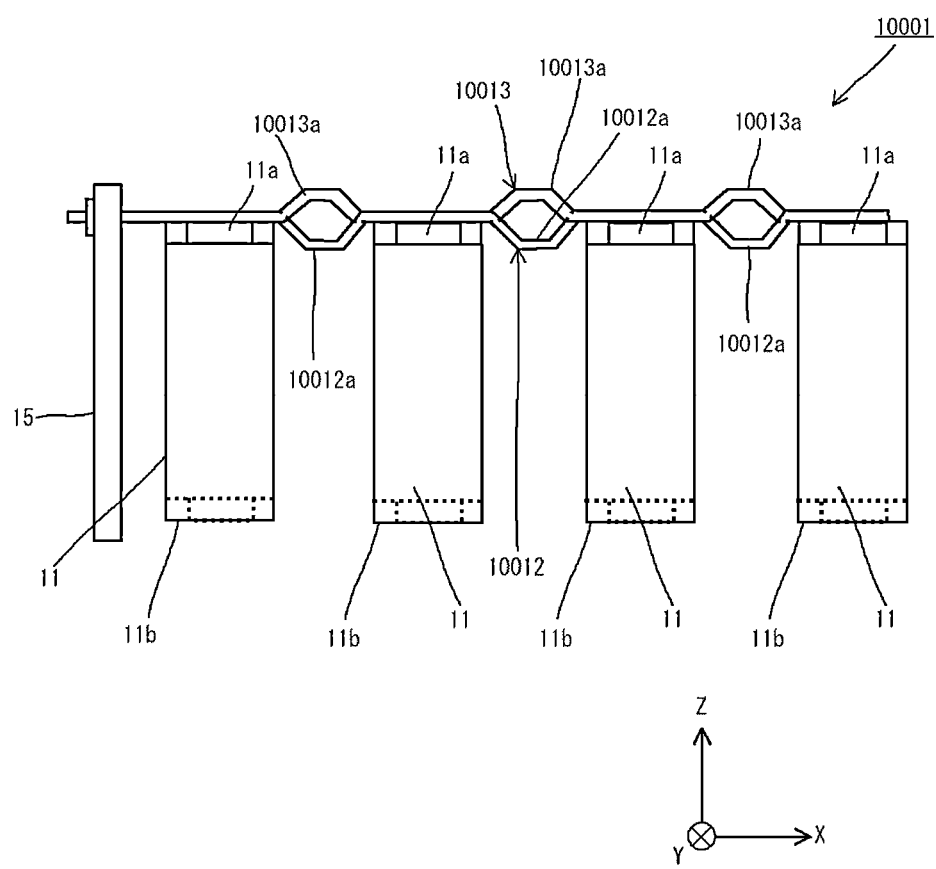
FIG. 10 is a side view of a battery pack according to a modified example of a preferred embodiment of the present invention.

Although the example in which each of the two tabs 12 and 13 has a flat plate shape has been explained in the above-described preferred embodiment, the shape of the tab is not limited thereto. For example, as in a battery pack 8001 illustrated in FIG. 9A, a tab 8012 having a flat plate shape and a tab 8013 including a recessed portion 8013a protruding toward the +Z direction side at a portion corresponding to the positive electrode terminal 11a of the battery 11 may be provided, and a side wall 8013b of the recessed portion 8013a may extend in the Z-axis direction. Alternatively, as in a battery pack 9001 illustrated in FIG. 9B, a tab 9012 having a flat plate shape and a tab 9013 including a recessed portion 9013a protruding toward the +Z direction side at a portion corresponding to the positive electrode terminal 11a of the battery 11 may be provided, and a side wall 9013b of the recessed portion 9013a of the tab 9013 may be inclined. Further, for example, as in a battery pack 10001 illustrated in FIG. 10, a tab 10012 including a recessed portion 10012a protruding toward the −Z direction side at a portion corresponding to a portion between the batteries 11 adjacent to each other, and a tab 10013 including a recessed portion 10013a protruding toward the +Z direction side at a portion corresponding to a portion between the batteries 11 adjacent to each other may be provided.

Figure 11:
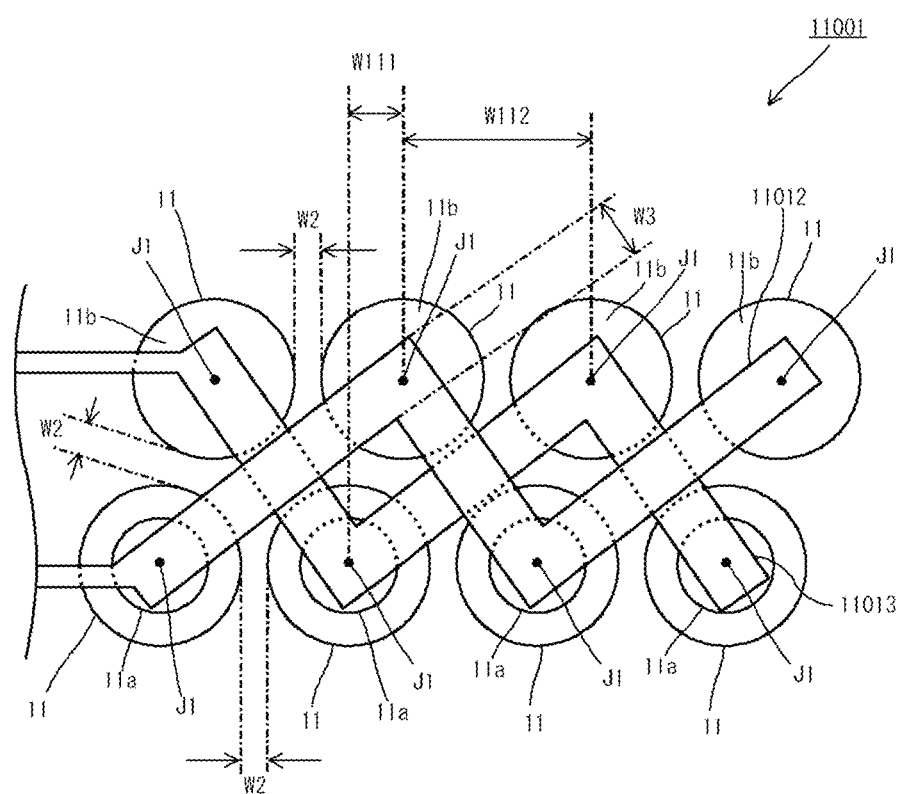
FIG. 11 is a plan view of a battery pack according to a modified example of a preferred embodiment of the present invention.

Although the example in which the eight batteries 11 are in parallel or substantially in parallel in a lattice shape has been explained in the above-described preferred embodiment, the arrangement of the eight batteries 11 is not limited thereto. For example, the eight batteries 11 may be positioned to define a zigzag pattern. That is, positions of the multiple batteries 11 may be shifted in the X-axis direction or the Y-axis direction from positions when the multiple batteries 11 are arranged in a complete lattice shape. For example, as in a battery pack 11001 illustrated in FIG. 11, the axis J1 of each of the four batteries 11 in parallel or substantially in parallel in the X-axis direction on the −Y direction side may be shifted by a distance W111 in the −X direction, with respect to the axis J1 of each of the four batteries 11 adjacent in the +Y direction and arranged in parallel or substantially in parallel in the X-axis direction. Here, the distance W111 is set to be less than half a distance W112 between the axes J1 of the respective two batteries 11 adjacent to each other in the X-axis direction. Here, the eight batteries 11 are connected by tabs 11012 and 11013.

According to this configuration, while the shortest distance W2 between the batteries 11 adjacent to each other is maintained, it is possible to reduce a distance in the Y-axis direction between a set of the four batteries 11 in parallel or substantially in parallel in the X-axis direction on the −Y direction side, and a set of the four batteries 11 in parallel or substantially in parallel in the X-axis direction on the +Y direction side. Thus, a size of the battery pack 11001 can be reduced.

Figure 12:
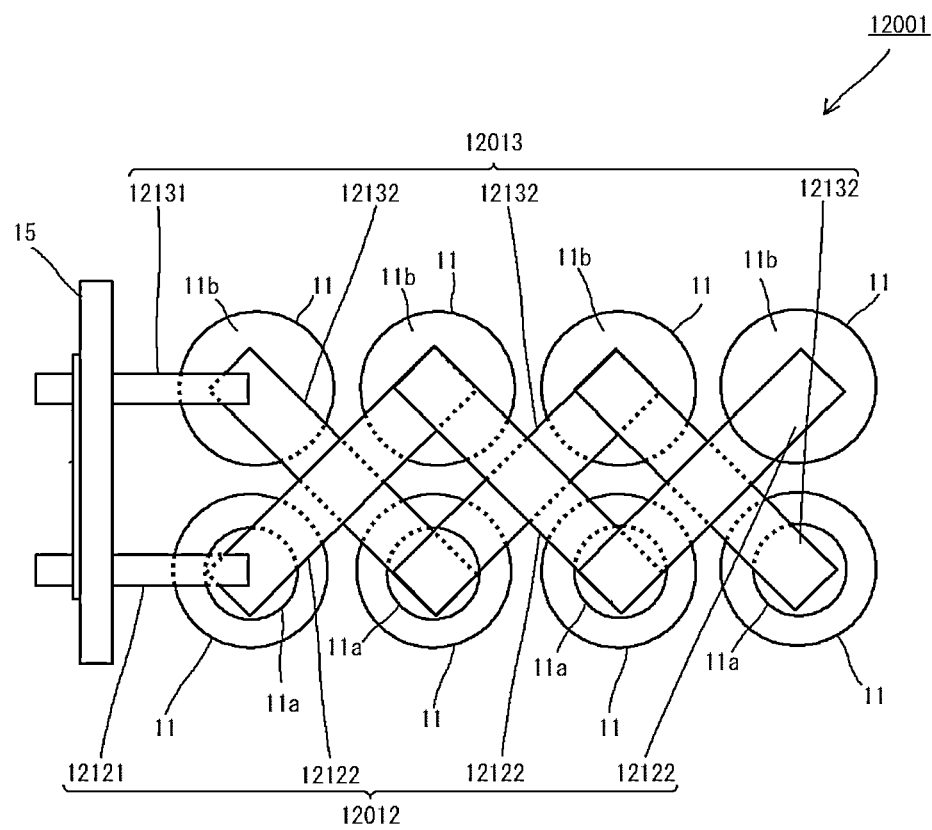
FIG. 12 is a plan view of a battery pack according to a modified example of a preferred embodiment of the present invention.
Figure 12:
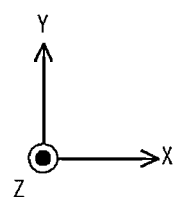

In the above-described preferred embodiment, the example in which each of the tabs 12 and 13 includes one metal plate has been explained, but the tab is not necessarily limited to being one metal plate. For example, as in a battery pack 12001 illustrated in FIG. 12, a tab 12013 including multiple sub-tabs 12131 and 12132, and a tab 12012 including multiple sub-tabs 12121 and 12122 may be provided. Here, each of the multiple sub-tabs 12121, 12122, 12131, and 12132 may have a rectangular or substantially rectangular plate shape having the same or substantially the same size.

According to this configuration, when the tabs 12012 and 12013 are attached to the positive electrode terminal 11a or the negative electrode terminal 11b of the battery 11, the sub-tabs 12121, 12122, 12131, and 12132 can be separately attached, thus a degree of freedom in the attachment method can be increased accordingly. Thus, manufacturing efficiency of the battery pack 12001 can be increased. In addition, even when the number of batteries 11 connected in parallel is changed, it is possible to cope with the change by changing the number of sub-tabs 12122 and 12132 included in the tabs 12012 and 12013, and thus it is possible to increase versatility of the tabs 12012 and 12013.

Although the example in which the battery 11 is a cylindrical battery has been explained in the above-described preferred embodiment, the shape of the battery 11 is not limited thereto, and the battery 11 may be, for example, a prismatic battery.

The above-described preferred embodiments and the modified examples of preferred embodiments of the present invention have been explained above, but the present invention is not limited thereto. The present invention includes those in which the above-described preferred embodiments and the modified examples of preferred embodiments are appropriately combined and those in which changes are appropriately added thereto.

Preferred embodiments of the present invention are each suitable to define an assembled battery including multiple batteries.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A battery pack, comprising:
a plurality of batteries with a tubular shape and parallel or substantially parallel to each other; and
a tab to electrically connect the plurality of batteries to each other; wherein
the plurality of batteries include:
a first set of batteries in parallel or substantially in parallel in a first direction; and
a second set of batteries in parallel or substantially in parallel in the first direction, and adjacent to the first set in a second direction orthogonal or substantially orthogonal to the first direction;
each of the batteries in the first set is connected by the tab to a battery other than a battery at a shortest distance among the batteries in the second set; and
each of the batteries in the first set is not directly connected by a tab to the battery at the shortest distance among the batteries in the second set.

2. The battery pack according to claim 1, wherein the plurality of batteries are positioned to define a zigzag pattern.

3. The battery pack according to claim 1, wherein the tab includes:
- a first tab connecting respective electrode terminals of a portion of the plurality of batteries to each other; and
- a second tab connecting respective electrode terminals of remaining batteries other than the portion of the plurality of batteries to each other; and
- the first tab and the second tab intersect each other at least at one position when viewed in a plan view from an axial direction of each of the plurality of batteries.

4. The battery pack according to claim 3, wherein the first tab and the second tab are spaced apart at a distance in the axial direction of each of the plurality of batteries.

5. The battery pack according to claim 4, wherein the first tab and the second tab are electrically connected to each other at least partially, at a portion where the first tab and the second tab intersect each other when viewed in the plan from the axial direction of each of the plurality of batteries.

6. The battery pack according to claim 1, wherein the tab includes a plurality of sub-tabs.

7. The battery pack according to claim 1, wherein
each of the plurality of batteries includes a positive electrode terminal on one end portion in an axial direction of each of the plurality of batteries, and a negative electrode terminal on another end portion in the axial direction;
the plurality of batteries include batteries in parallel or substantially in parallel in the first direction arranged such that directions extending from the positive electrode terminals toward the negative electrode terminals are the same, and are opposite to a direction extending from the positive electrode terminals towards the negative electrode terminals in the axial direction in batteries adjacent in the second direction and in parallel or substantially in parallel in the first direction.

8. The battery pack according to claim 1, wherein each of the plurality of batteries is a rechargeable secondary battery.

9. The battery pack according to claim 8, wherein each of the plurality of batteries is a lithium-ion battery, a nickel-hydrogen battery, or a nickel-cadmium battery.

10. The battery pack according to claim 1, wherein the tab is a metal plate made of Cu or Al.

11. The battery pack according to claim 1, wherein each of the first and second set of batteries includes four batteries.

12. The battery pack according to claim 1, wherein each of the first and second sets of batteries includes two batteries.

13. The battery pack according to claim 1, wherein each of the first and second sets of batteries includes three batteries.

14. The battery pack according to claim 1, wherein the plurality of batteries includes eight batteries.

15. The battery pack according to claim 1, wherein the plurality of batteries includes four batteries.

16. The battery pack according to claim 1, wherein the plurality of batteries includes six batteries.

17. The battery pack according to claim 1, wherein the tab has a flat plate shape.

18. The battery pack according to claim 1, wherein the tab includes a recessed portion.

* * * * *